US012720338B2

(12) United States Patent
Kim et al.

(10) Patent No.: US 12,720,338 B2
(45) Date of Patent: Aug. 25, 2026

(54) METHOD AND APPARATUS FOR BEAM RECOVERY IN COMMUNICATION NETWORK

(71) Applicant: Electronics and Telecommunications Research Institute, Daejeon (KR)

(72) Inventors: Jung Im Kim, Daejeon (KR); Young Jo Ko, Daejeon (KR); Jun Sik Kim, Daejeon (KR); Soon Gi Park, Daejeon (KR); Sung Cheol Chang, Daejeon (KR); Sun Mi Jun, Daejeon (KR); Hee Sang Chung, Daejeon (KR); Yong Seouk Choi, Daejeon (KR)

(73) Assignee: Electronics and Telecommunications Research Institute, Daejeon (KR)

( * ) Notice: Subject to any disclaimer, the term of this patent is extended or adjusted under 35 U.S.C. 154(b) by 321 days.

(21) Appl. No.: 18/525,314

(22) Filed: Nov. 30, 2023

(65) Prior Publication Data

US 2024/0187889 A1 Jun. 6, 2024

(30) Foreign Application Priority Data

Dec. 1, 2022 (KR) ........................ 10-2022-0165461
Nov. 29, 2023 (KR) ........................ 10-2023-0170199

(51) Int. Cl.
*H04W 24/04* (2009.01)
*H04B 7/06* (2006.01)

(52) U.S. Cl.
CPC ........ *H04W 24/04* (2013.01); *H04B 7/06952* (2023.05)

(58) Field of Classification Search
CPC .. H04B 7/0695; H04B 7/06952; H04B 7/088; H04W 24/04
See application file for complete search history.

(56) References Cited

U.S. PATENT DOCUMENTS

| | | | | |
|---|---|---|---|---|
| 11,245,465 | B2 | 2/2022 | Zhou et al. | |
| 11,502,737 | B2 | 11/2022 | Yang | |
| 2020/0196216 | A1 | 6/2020 | Hui et al. | |
| 2020/0245156 | A1* | 7/2020 | Takano | H04B 7/0695 |
| 2020/0382196 | A1* | 12/2020 | Mohandoss | H04B 17/17 |
| 2021/0058998 | A1* | 2/2021 | Yuan | H04W 24/08 |
| 2021/0068162 | A1* | 3/2021 | Agiwal | H04L 5/0048 |
| 2021/0235422 | A1 | 7/2021 | Hwang et al. | |
| 2021/0409097 | A1 | 12/2021 | Zhang et al. | |
| 2022/0045736 | A1* | 2/2022 | Hu | H04W 72/0446 |
| 2023/0051047 | A1 | 2/2023 | Xu et al. | |
| 2023/0085151 | A1 | 3/2023 | Kim et al. | |

FOREIGN PATENT DOCUMENTS

| | | | |
|---|---|---|---|
| KR | 10-2020-0015546 | A | 2/2020 |
| WO | 2018231655 | A1 | 12/2018 |
| WO | 2022030780 | A1 | 2/2022 |

* cited by examiner

*Primary Examiner* — Awet Haile
(74) *Attorney, Agent, or Firm* — Sughrue Mion, PLLC

(57) ABSTRACT

A method of a base station may comprise: detecting a beam failure for a terminal; in response to detecting the beam failure, transmitting a beam recovery early indicator (BREI) to the terminal based on a beam sweeping scheme; receiving a BREI response from the terminal; and identifying a preferred beam of the terminal based on reception of the BREI response.

14 Claims, 11 Drawing Sheets

FIG. 3

340
data network
330
feeder link
310
service link
beam foot print
320

FIG. 6

SSB (beam 1)
SSB (beam 2)
SSB (beam 3)
SSB (beam 4)
SSB (beam 5)
SSB (beam 6)
SSB (beam 7)
SSB (beam 8)

frequency

| | BREI (beam 1) | BREI (beam 2) | BREI (beam 3) | BREI (beam 4) | BREI (beam 5) | BREI (beam 6) | BREI (beam 7) | BREI (beam 8) | |
|---|---|---|---|---|---|---|---|---|---|
| | | | | | | | | | |

time terminal
base station
S1101
S1102
PEI (PDCCH)
paging DCI (PDCCH)
PEI (beam 1)
PEI (beam 2)
PEI (beam 3)
PEI (beam 4)
PEI (beam 5)
PEI (beam 6)
PEI (beam 7)
PEI (beam 8)
time

METHOD AND APPARATUS FOR BEAM RECOVERY IN COMMUNICATION NETWORK

CROSS-REFERENCE TO RELATED APPLICATIONS

This application claims priority to Korean Patent Applications No. 10-2022-0165461, filed on Dec. 1, 2022, and No. 10-2023-0170199, filed on Nov. 29, 2023, with the Korean Intellectual Property Office (KIPO), the entire contents of which are hereby incorporated by reference.

BACKGROUND

1. Technical Field

Exemplary embodiments of the present disclosure relate to a beam recovery technique, and more specifically, to a beam recovery technique in a communication network supporting a high frequency band.

2. Related Art

The communication system (e.g. a new radio (NR) communication system) using a higher frequency band (e.g. a frequency band of 6 GHz or above) than a frequency band (e.g. a frequency band of 6 GHz or below) of the long term evolution (LTE) communication system (or, LTE-A communication system) is being considered for processing of soaring wireless data. The NR system may support not only a frequency band of 6 GHz or below, but also a frequency band of 6 GHz or above, and may support various communication services and scenarios compared to the LTE system. In addition, requirements of the NR system may include enhanced Mobile BroadBand (eMBB), Ultra Reliable Low Latency Communication (URLLC), and Massive Machine Type Communication (mMTC).

A communication network (e.g. NR network) may be classified into a terrestrial network and a non-terrestrial network. The non-terrestrial network may be referred to as an NTN. In a terrestrial network, communication services for a terminal may be provided by a base station located on the ground. In a non-terrestrial network, communication services for a terminal may be provided by a communication node (e.g. satellite, base station, unmanned aerial vehicle (UAV), drone, or the like) located in a non-terrestrial location. Communication in the terrestrial network and the non-terrestrial network may be performed based on the NR communication technology.

Meanwhile, the communication network can support communication in high-frequency bands such as mmWave, THz, and/or similar frequencies. In this case, some signals may be transmitted based on a beam-sweeping scheme. However, a beam-sweeping operation may not be applied to physical downlink control channel (PDCCH) transmission. If a beam-sweeping operation is not applied to PDCCH transmission for paging, a terminal may not be able to receive a PDCCH. Therefore, the terminal may not receive a paging indicator and/or paging information, and a paging procedure may not be performed. Additionally, if the beam-sweeping operation is not applied to a beam recovery procedure, the beam recovery procedure may fail.

SUMMARY

Exemplary embodiments of the present disclosure are directed to providing a method and an apparatus for beam recovery in a communication network supporting a high frequency band.

According to a first exemplary embodiment of the present disclosure, a method of a base station may comprise: detecting a beam failure for a terminal; in response to detecting the beam failure, transmitting a beam recovery early indicator (BREI) to the terminal based on a beam sweeping scheme; receiving a BREI response from the terminal; and identifying a preferred beam of the terminal based on reception of the BREI response.

When uplink transmission is not received from the terminal, the beam failure may be determined to have occurred, and the uplink transmission may be physical uplink shared channel (PUSCH) transmission, physical uplink control channel (PUCCH) transmission, or sounding reference signal (SRS) transmission.

When a reception failure of uplink transmission of the terminal occurs more than M times during a preset time, the beam failure may be determined to have occurred, and M is a natural number.

The transmitting of the BREI to the terminal may comprise: generating downlink control information (DCI) including the BREI; and transmitting the DCI to the terminal based on the beam sweeping scheme.

The DCI including the BREI may be a DCI having a cyclic redundancy check (CRC) scrambled by a BREI-radio network temporary identifier (BREI-RNTI).

The DCI may include transmission resource information of the BREI response, and the transmission resource information may indicate a BREI response resource for each beam.

The identifying of the preferred beam of the terminal may comprise: identifying a first BREI response resource in which the BREI response is received among BREI response resources allocated to the terminal; and determining a first beam associated with the first BREI response resource as the preferred beam.

The method may further comprise: transmitting configuration information of an early beam recovery procedure to the terminal, wherein the configuration information may include at least one of information indicating that the early beam recovery procedure is enabled or a BREI-RNTI, and the early beam recovery procedure may be initiated by the base station.

The method may further comprise: transmitting an SRS transmission request to the terminal using a beam corresponding to the preferred beam; and receiving an SRS from the terminal on an SRS resource associated with the preferred beam.

According to a second exemplary embodiment of the present disclosure, a method of a terminal may comprise: receiving, from a base station, one or more downlink control information (DCIs) including a beam recovery early indicator (BREI) and transmission resource information of a BREI response; determining a beam in which a DCI with a best reception quality among the one or more DCIs is received as a preferred beam of the terminal; and transmitting the BREI response to the base station using the preferred beam in a first BREI response resource indicated by the transmission resource information.

When the one or more DCIs including the BREI and the transmission resource information of the BREI response are received, a beam failure may be determined to have been detected at the base station.

The receiving of the one or more DCIs from the base station may comprise: detecting the one or more DCIs by performing blind decoding using a BREI-radio network temporary identifier (BREI-RNTI), and each of the one or more DCIs may have a cyclic redundance check scrambled by the BREI-RNTI.

The transmission resource information of the BREI response may indicate a BREI response resource for each beam, and the BREI response may be transmitted in a first BREI response resource associated with the preferred beam.

The method may further comprise: receiving configuration information of an early beam recovery procedure from the base station, wherein the configuration information may include at least one of information indicating that the early beam recovery procedure is enabled or a BREI-RNTI, and the early beam recovery procedure is initiated by the base station.

The method may further comprise: receiving a sounding reference signal (SRS) transmission request from the base station through a beam corresponding to the preferred beam; and transmitting an SRS to the base station on an SRS resource associated with the preferred beam.

According to a third exemplary embodiment of the present disclosure, a base station may comprise at least one processor, wherein the at least one processor may cause the base station to perform: detecting a beam failure for a terminal; in response to detecting the beam failure, transmitting a beam recovery early indicator (BREI) to the terminal based on a beam sweeping scheme; receiving a BREI response from the terminal; and identifying a preferred beam of the terminal based on reception of the BREI response.

When uplink transmission is not received from the terminal, the beam failure may be determined to have occurred, and the uplink transmission may be physical uplink shared channel (PUSCH) transmission, physical uplink control channel (PUCCH) transmission, or sounding reference signal (SRS) transmission.

In the transmitting of the BREI to the terminal, the at least one processor may further cause the base station to perform: generating downlink control information (DCI) including the BREI; and transmitting the DCI to the terminal based on the beam sweeping scheme.

The DCI including the BREI may be a DCI having a cyclic redundancy check (CRC) scrambled by a BREI-radio network temporary identifier (BREI-RNTI).

In the identifying of the preferred beam of the terminal, the at least one processor may further cause the base station to perform: identifying a first BREI response resource in which the BREI response is received among BREI response resources allocated to the terminal; and determining a first beam associated with the first BREI response resource as the preferred beam.

According to the present disclosure, when a beam failure is detected, the base station can initiate a beam recovery procedure by transmitting a BREI based on a beam-sweeping scheme. In this case, the beam recovery procedure can be performed quickly, and the failure probability of the beam recovery procedure can be reduced. Additionally, the base station may transmit a paging early indicator (PEI) and/or paging DCI based on a beam-sweeping scheme. In this case, a paging procedure can be performed quickly, and the failure probability of the paging procedure can be reduced.

BRIEF DESCRIPTION OF DRAWINGS

FIG. 3 is a conceptual diagram illustrating a second exemplary embodiment of a communication network.

FIG. 6 is a conceptual diagram illustrating a BREI transmission method based on a beam sweeping scheme.

DETAILED DESCRIPTION OF THE EMBODIMENTS

Figure 1:
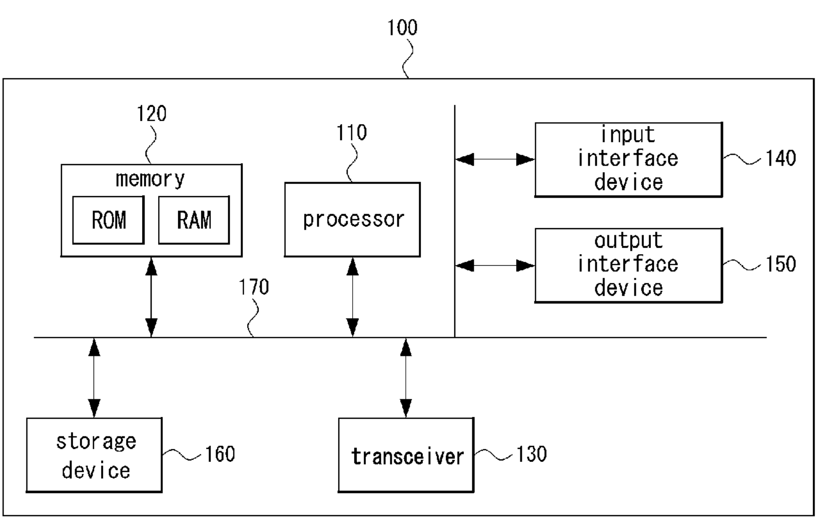
FIG. 1 is a block diagram illustrating a first exemplary embodiment of a communication node in a communication network.

Exemplary embodiments of the present disclosure are disclosed herein. However, specific structural and functional details disclosed herein are merely representative for purposes of describing embodiments of the present disclosure. Thus, embodiments of the present disclosure may be embodied in many alternate forms and should not be construed as limited to embodiments of the present disclosure set forth herein.

Accordingly, while the present disclosure is capable of various modifications and alternative forms, specific embodiments thereof are shown by way of example in the drawings and will herein be described in detail. It should be understood, however, that there is no intent to limit the present disclosure to the particular forms disclosed, but on the contrary, the present disclosure is to cover all modifications, equivalents, and alternatives falling within the spirit and scope of the present disclosure. Like numbers refer to like elements throughout the description of the figures.

It will be understood that, although the terms first, second, etc. may be used herein to describe various elements, these elements should not be limited by these terms. These terms are only used to distinguish one element from another. For example, a first element could be termed a second element, and, similarly, a second element could be termed a first element, without departing from the scope of the present disclosure. As used herein, the term "and/or" includes any and all combinations of one or more of the associated listed items.

In exemplary embodiments of the present disclosure, "at least one of A and B" may mean "at least one of A or B" or "at least one of combinations of one or more of A and B". Also, in exemplary embodiments of the present disclosure, "one or more of A and B" may mean "one or more of A or B" or "one or more of combinations of one or more of A and B".

It will be understood that when an element is referred to as being "connected" or "coupled" to another element, it can be directly connected or coupled to the other element or intervening elements may be present. In contrast, when an element is referred to as being "directly connected" or "directly coupled" to another element, there are no intervening elements present. Other words used to describe the relationship between elements should be interpreted in a like fashion (i.e. "between" versus "directly between," "adjacent" versus "directly adjacent," etc.).

The terminology used herein is for the purpose of describing particular embodiments only and is not intended to be limiting of the present disclosure. As used herein, the singular forms "a," "an" and "the" are intended to include the plural forms as well, unless the context clearly indicates otherwise. It will be further understood that the terms "comprises," "comprising," "includes" and/or "including," when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this present disclosure belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Hereinafter, exemplary embodiments of the present disclosure will be described in greater detail with reference to the accompanying drawings. In order to facilitate general understanding in describing the present disclosure, the same components in the drawings are denoted with the same reference signs, and repeated description thereof will be omitted.

A communication system to which exemplary embodiments according to the present disclosure are applied will be described. The communication system may be the 4G communication system (e.g. Long-Term Evolution (LTE) communication system or LTE-A communication system), the 5G communication system (e.g. New Radio (NR) communication system), the sixth generation (6G) communication system, or the like. The 4G communication system may support communications in a frequency band of 6 GHz or below, and the 5G communication system may support communications in a frequency band of 6 GHz or above as well as the frequency band of 6 GHz or below. The communication network may include a terrestrial network and a non-terrestrial network. The communication system to which the exemplary embodiments according to the present disclosure are applied is not limited to the contents described below, and the exemplary embodiments according to the present disclosure may be applied to various communication systems. Here, the communication system may be used in the same sense as a communication network, 'LTE' may refer to '4G communication system', 'LTE communication system', or 'LTE-A communication system', and 'NR' may refer to '5G communication system' or 'NR communication system'.

In exemplary embodiments, "an operation (e.g. transmission operation) is configured" may mean that "configuration information (e.g. information element(s) or parameter(s)) for the operation and/or information indicating to perform the operation is signaled". "Information element(s) (e.g. parameter(s)) are configured" may mean that "corresponding information element(s) are signaled". In other words, "an operation (e.g. transmission operation) is configured in a communication node" may mean that the communication node receives "configuration information (e.g. information elements, parameters) for the operation" and/or "information indicating to perform the operation". "An information element (e.g. parameter) is configured in a communication node" may mean that "the information element is signaled to the communication node (e.g. the communication node receives the information element)".

The signaling may be at least one of system information (SI) signaling (e.g. transmission of system information block (SIB) and/or master information block (MIB)), RRC signaling (e.g. transmission of RRC parameters and/or higher layer parameters), MAC control element (CE) signaling, or PHY signaling (e.g. transmission of downlink control information (DCI), uplink control information (UCI), and/or sidelink control information (SCI)). A signaling message may be at least one of an SI signaling message (e.g. SI message), an RRC signaling message (e.g. RRC message), a MAC CE signaling message (e.g. MAC CE message or MAC message), or a PHY signaling message (e.g. PHY message).

Hereinafter, even when a method (e.g. transmission or reception of a signal) performed at a first communication node among communication nodes is described, a corresponding second communication node may perform a method (e.g. reception or transmission of the signal) corresponding to the method performed at the first communication node. That is, when an operation of a terminal is described, a base station corresponding to the terminal may perform an operation corresponding to the operation of the terminal. Conversely, when an operation of a base station is described, a terminal corresponding to the base station may perform an operation corresponding to the operation of the base station. In addition, when an operation of a first terminal is described, a second terminal corresponding to the first terminal may perform an operation corresponding to the operation of the first terminal. Conversely, when an operation of a second terminal is described, a first terminal corresponding to the second terminal may perform an operation corresponding to the operation of the second terminal.

FIG. 1 is a block diagram illustrating a first exemplary embodiment of a communication node in a communication network.

Referring to FIG. 1, a communication node 100 may comprise at least one processor 110, a memory 120, and a transceiver 130 connected to the network for performing communications. Also, the communication node 100 may further comprise an input interface device 140, an output interface device 150, a storage device 160, and the like. Each component included in the communication node 100 may communicate with each other as connected through a bus 170.

However, each component included in the communication node 100 may not be connected to the common bus 170 but may be connected to the processor 110 via an individual interface or a separate bus. For example, the processor 110 may be connected to at least one of the memory 120, the transceiver 130, the input interface device 140, the output interface device 150 and the storage device 160 via a dedicated interface.

The processor 110 may execute a program stored in at least one of the memory 120 and the storage device 160. The processor 110 may refer to a central processing unit (CPU), a graphics processing unit (GPU), or a dedicated processor on which methods in accordance with embodiments of the present disclosure are performed. Each of the memory 120 and the storage device 160 may be constituted by at least one of a volatile storage medium and a non-volatile storage medium. For example, the memory 120 may comprise at least one of read-only memory (ROM) and random access memory (RAM).

Figure 2:
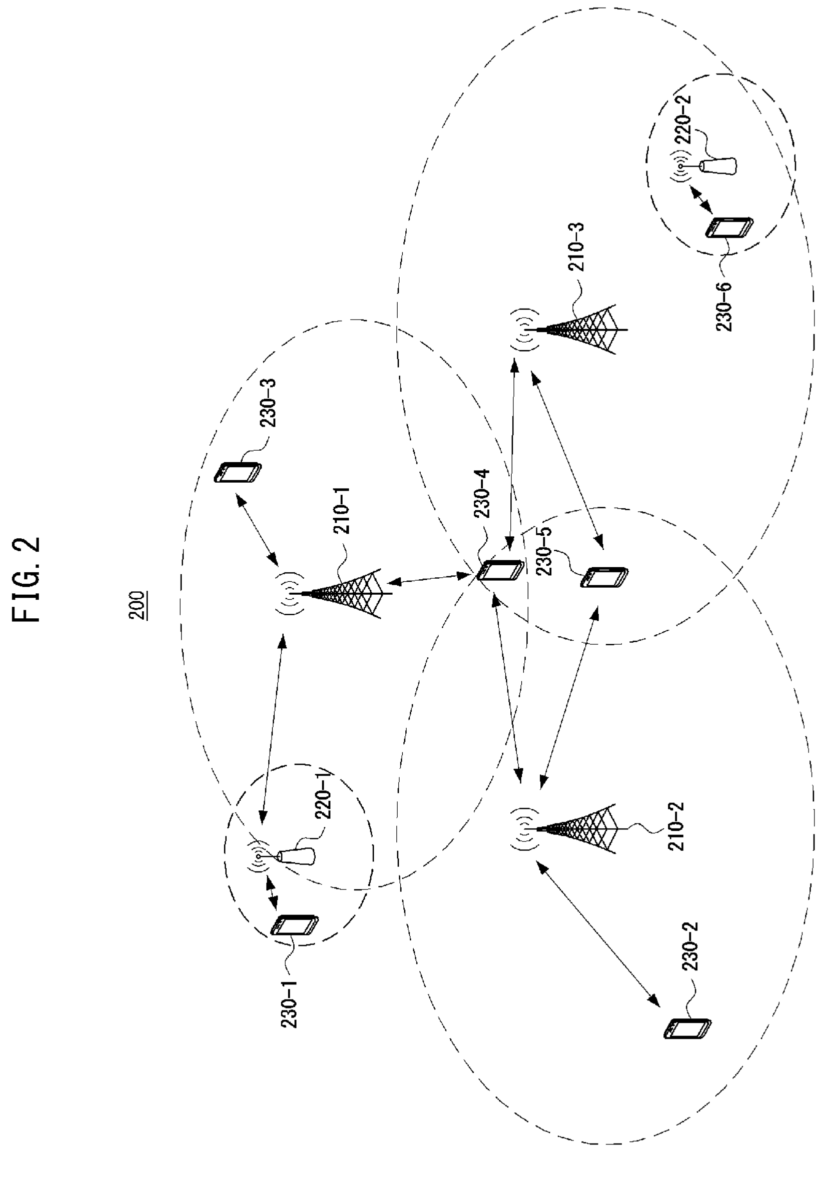
FIG. 2 is a conceptual diagram illustrating a first exemplary embodiment of a communication network.

FIG. 2 is a conceptual diagram illustrating a first exemplary embodiment of a communication network.

Referring to FIG. 2, a communication network 200 may be a terrestrial network. The communication system 200 may comprise a plurality of communication nodes 210-1, 210-2, 210-3, 220-1, 220-2, 230-1, 230-2, 230-3, 230-4, 230-5, and 230-6. In addition, the communication system 200 may further comprise a core network (e.g. a serving gateway (S-GW), a packet data network (PDN) gateway (P-GW), and a mobility management entity (MME)). When the communication system 200 is a 5G communication system (e.g. new radio (NR) system), the core network may include an access and mobility management function (AMF), a user plane function (UPF), a session management function (SMF), and the like.

The plurality of communication nodes 210 to 230 may support a communication protocol defined by the 3rd generation partnership project (3GPP) specifications (e.g. LTE communication protocol, LTE-A communication protocol, NR communication protocol, or the like). The plurality of communication nodes 210 to 230 may support code division multiple access (CDMA) technology, wideband CDMA (WCDMA) technology, time division multiple access (TDMA) technology, frequency division multiple access (FDMA) technology, orthogonal frequency division multiplexing (OFDM) technology, filtered OFDM technology, cyclic prefix OFDM (CP-OFDM) technology, discrete Fourier transform-spread-OFDM (DFT-s-OFDM) technology, orthogonal frequency division multiple access (OFDMA) technology, single carrier FDMA (SC-FDMA) technology, non-orthogonal multiple access (NOMA) technology, generalized frequency division multiplexing (GFDM) technology, filter band multi-carrier (FBMC) technology, universal filtered multi-carrier (UFMC) technology, space division multiple access (SDMA) technology, or the like. Each of the plurality of communication nodes may have the following structure.

The communication system 200 may comprise a plurality of base stations 210-1, 210-2, 210-3, 220-1, and 220-2, and a plurality of terminals 230-1, 230-2, 230-3, 230-4, 230-5, and 230-6. Each of the first base station 210-1, the second base station 210-2, and the third base station 210-3 may form a macro cell, and each of the fourth base station 220-1 and the fifth base station 220-2 may form a small cell. The fourth base station 220-1, the third terminal 230-3, and the fourth terminal 230-4 may belong to cell coverage of the first base station 210-1. Also, the second terminal 230-2, the fourth terminal 230-4, and the fifth terminal 230-5 may belong to cell coverage of the second base station 210-2. Also, the fifth base station 220-2, the fourth terminal 230-4, the fifth terminal 230-5, and the sixth terminal 230-6 may belong to cell coverage of the third base station 210-3. Also, the first terminal 230-1 may belong to cell coverage of the fourth base station 220-1, and the sixth terminal 230-6 may belong to cell coverage of the fifth base station 220-2.

Here, each of the plurality of base stations 210-1, 210-2, 210-3, 220-1, and 220-2 may refer to a Node-B (NB), a evolved Node-B (eNB), a gNB, an advanced base station (ABS), a high reliability-base station (HR-BS), a base transceiver station (BTS), a radio base station, a radio transceiver, an access point, an access node, a radio access station (RAS), a mobile multihop relay-base station (MMR-BS), a relay station (RS), an advanced relay station (ARS), a high reliability-relay station (HR-RS), a home NodeB (HNB), a home eNodeB (HeNB), a road side unit (RSU), a radio remote head (RRH), a transmission point (TP), a transmission and reception point (TRP), or the like.

Each of the plurality of terminals 230-1, 230-2, 230-3, 230-4, 230-5, and 230-6 may refer to a user equipment (UE), a terminal equipment (TE), an advanced mobile station (AMS), a high reliability-mobile station (HR-MS), a terminal, an access terminal, a mobile terminal, a station, a subscriber station, a mobile station, a portable subscriber station, a node, a device, an on-board unit (OBU), or the like.

Each of the plurality of base stations 210-1, 210-2, 210-3, 220-1, and 220-2 may operate in the same frequency band or in different frequency bands. The plurality of base stations 210-1, 210-2, 210-3, 220-1, and 220-2 may be connected to each other via an ideal backhaul or a non-ideal backhaul, and exchange information with each other via the ideal or non-ideal backhaul. Also, each of the plurality of base stations 210-1, 210-2, 210-3, 220-1, and 220-2 may be connected to the core network through the ideal or non-ideal backhaul. Each of the plurality of base stations 210-1, 210-2, 210-3, 220-1, and 220-2 may transmit a signal received from the core network to the corresponding terminal 230-1, 230-2, 230-3, 230-4, 230-5, or 230-6, and transmit a signal received from the corresponding terminal 230-1, 230-2, 230-3, 230-4, 230-5, or 230-6 to the core network.

In addition, each of the plurality of base stations 210-1, 210-2, 210-3, 220-1, and 220-2 may support a multi-input multi-output (MIMO) transmission (e.g. a single-user MIMO (SU-MIMO), a multi-user MIMO (MU-MIMO), a massive MIMO, or the like), a coordinated multipoint (COMP) transmission, a carrier aggregation (CA) transmission, a transmission in unlicensed band, device-to-device (D2D) communication (or, proximity services (ProSe)), Internet of Things (IoT) communications, dual connectivity (DC), or the like. Here, each of the plurality of terminals 230-1, 230-2, 230-3, 230-4, 230-5, and 230-6 may perform operations corresponding to the operations of the plurality of base stations 210-1, 210-2, 210-3, 220-1, and 220-2 (i.e. the operations supported by the plurality of base stations 210-1, 210-2, 210-3, 220-1, and 220-2). For example, the second base station 210-2 may transmit a signal to the fourth terminal 230-4 in the SU-MIMO manner, and the fourth terminal 230-4 may receive the signal from the second base station 210-2 in the SU-MIMO manner. Alternatively, the second base station 210-2 may transmit a signal to the fourth terminal 230-4 and fifth terminal 230-5 in the MU-MIMO manner, and the fourth terminal 230-4 and fifth terminal 230-5 may receive the signal from the second base station 210-2 in the MU-MIMO manner.

The first base station 210-1, the second base station 210-2, and the third base station 210-3 may transmit a signal to the fourth terminal 230-4 in the COMP transmission manner, and the fourth terminal 230-4 may receive the signal from the first base station 210-1, the second base station 210-2, and the third base station 210-3 in the COMP manner. Also, each of the plurality of base stations 210-1, 210-2, 210-3, 220-1, and 220-2 may exchange signals with the corresponding terminals 230-1, 230-2, 230-3, 230-4, 230-5, or 230-6 which belongs to its cell coverage in the CA manner. Each of the base stations 210-1, 210-2, and 210-3 may control D2D communications between the fourth terminal 230-4 and the fifth terminal 230-5, and thus the fourth terminal 230-4 and the fifth terminal 230-5 may perform the D2D communications under control of the second base station 210-2 and the third base station 210-3.

Figure 3:
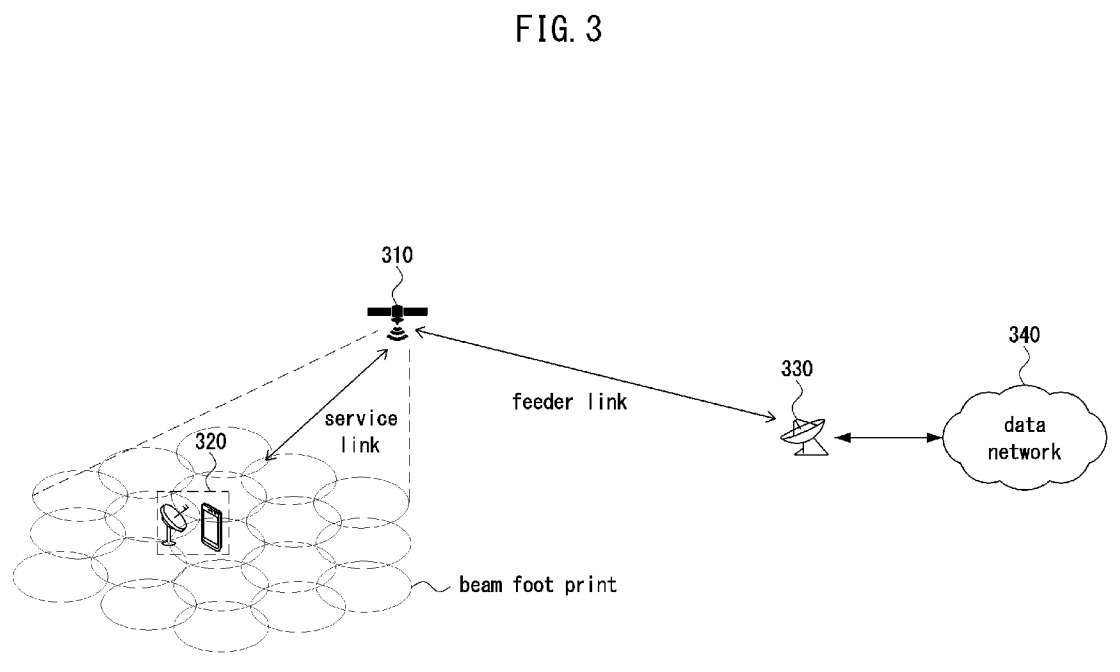

FIG. 3 is a conceptual diagram illustrating a second exemplary embodiment of a communication network.

Referring to FIG. 3, a communication network may be a non-terrestrial network (NTN). The NTN may include a satellite 310, a communication node 320, a gateway 330, a data network 340, and the like. The NTN shown in FIG. 3 may be an NTN based on a transparent payload. The satellite 310 may be a low earth orbit (LEO) satellite, a medium earth orbit (MEO) satellite, a geostationary earth orbit (GEO) satellite, a high elliptical orbit (HEO) satellite, or an unmanned aircraft system (UAS) platform. The UAS platform may include a high altitude platform station (HAPS).

The communication node 320 may include a communication node (e.g. a user equipment (UE) or a terminal) located on a terrestrial site and a communication node (e.g. an airplane, a drone) located on a non-terrestrial space. A service link may be established between the satellite 310 and the communication node 320, and the service link may be a radio link. The satellite 310 may provide communication services to the communication node 320 using one or more beams. The shape of a footprint of the beam of the satellite 310 may be elliptical.

The communication node 320 may perform communications (e.g. downlink communication and uplink communication) with the satellite 310 using LTE technology and/or NR technology. The communications between the satellite 310 and the communication node 320 may be performed using an NR-Uu interface. When dual connectivity (DC) is supported, the communication node 320 may be connected to other base stations (e.g. base stations supporting LTE and/or NR functionality) as well as the satellite 310, and perform DC operations based on the techniques defined in the LTE and/or NR specifications.

The gateway 330 may be located on a terrestrial site, and a feeder link may be established between the satellite 310 and the gateway 330. The feeder link may be a radio link. The gateway 330 may be referred to as a 'non-terrestrial network (NTN) gateway'. The communications between the satellite 310 and the gateway 330 may be performed based on an NR-Uu interface or a satellite radio interface (SRI). The gateway 330 may be connected to the data network 340. There may be a 'core network' between the gateway 330 and the data network 340. In this case, the gateway 330 may be connected to the core network, and the core network may be connected to the data network 340. The core network may support the NR technology. For example, the core network may include an access and mobility management function (AMF), a user plane function (UPF), a session management function (SMF), and the like. The communications between the gateway 330 and the core network may be performed based on an NG-C/U interface.

Alternatively, a base station and the core network may exist between the gateway 330 and the data network 340. In this case, the gateway 330 may be connected with the base station, the base station may be connected with the core network, and the core network may be connected with the data network 340. The base station and core network may support the NR technology. The communications between the gateway 330 and the base station may be performed based on an NR-Uu interface, and the communications between the base station and the core network (e.g. AMF, UPF, SMF, and the like) may be performed based on an NG-C/U interface.

Figure 4:
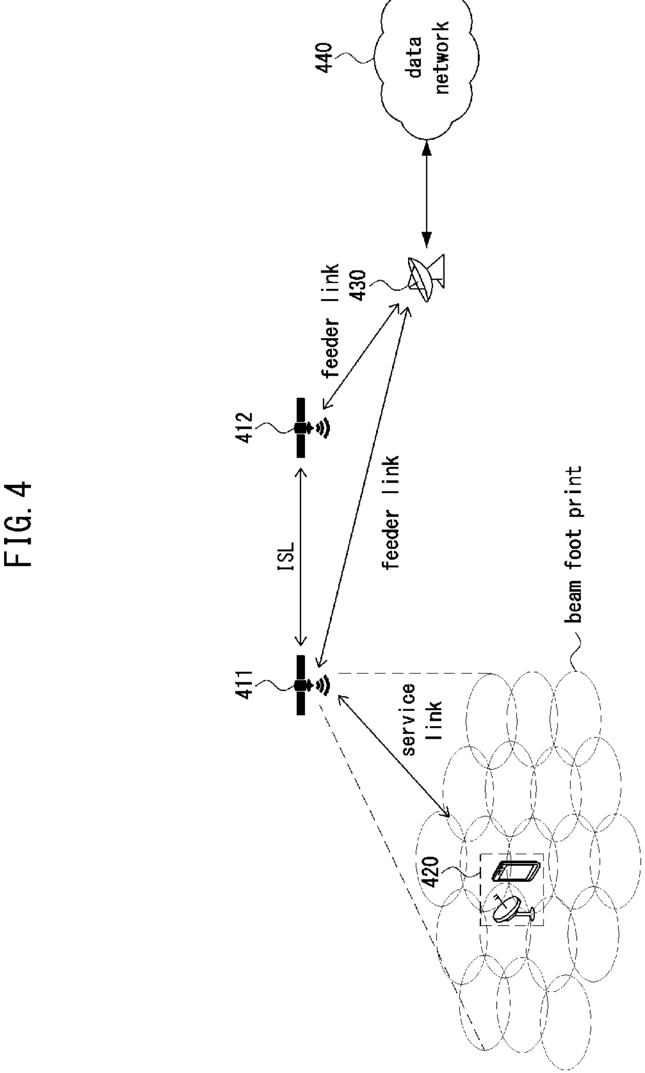
FIG. 4 is a conceptual diagram illustrating a third exemplary embodiment of a communication network.

FIG. 4 is a conceptual diagram illustrating a third exemplary embodiment of a communication network.

Referring to FIG. 4, a communication network may be an NTN. The NTN may include a first satellite 411, a second satellite 412, a communication node 420, a gateway 430, a data network 440, and the like. The NTN shown in FIG. 4 may be a regenerative payload based NTN. For example, each of the satellites 411 and 412 may perform a regenerative operation (e.g. demodulation, decoding, re-encoding, re-modulation, and/or filtering operation) on a payload received from other entities (e.g. the communication node 420 or the gateway 430), and transmit the regenerated payload Each of the satellites 411 and 412 may be a LEO satellite, a MEO satellite, a GEO satellite, a HEO satellite, or a UAS platform. The UAS platform may include a HAPS. The satellite 411 may be connected to the satellite 412, and an inter-satellite link (ISL) may be established between the satellite 411 and the satellite 412. The ISL may operate in an RF frequency band or an optical band. The ISL may be established optionally. The communication node 420 may include a terrestrial communication node (e.g. UE or terminal) and a non-terrestrial communication node (e.g. airplane or drone). A service link (e.g. radio link) may be established between the satellite 411 and communication node 420. The satellite 411 may provide communication services to the communication node 420 using one or more beams.

The communication node 420 may perform communications (e.g. downlink communication or uplink communication) with the satellite 411 using LTE technology and/or NR technology. The communications between the satellite 411 and the communication node 420 may be performed using an NR-Uu interface. When DC is supported, the communication node 420 may be connected to other base stations (e.g. base stations supporting LTE and/or NR functionality) as well as the satellite 411, and may perform DC operations based on the techniques defined in the LTE and/or NR specifications.

The gateway 430 may be located on a terrestrial site, a feeder link may be established between the satellite 411 and the gateway 430, and a feeder link may be established between the satellite 412 and the gateway 430. The feeder link may be a radio link. When the ISL is not established between the satellite 411 and the satellite 412, the feeder link between the satellite 411 and the gateway 430 may be established mandatorily.

The communications between each of the satellites 411 and 412 and the gateway 430 may be performed based on an NR-Uu interface or an SRI. The gateway 430 may be connected to the data network 440. There may be a core network between the gateway 430 and the data network 440. In this case, the gateway 430 may be connected to the core network, and the core network may be connected to the data network 440. The core network may support the NR technology. For example, the core network may include AMF, UPF, SMF, and the like. The communications between the gateway 430 and the core network may be performed based on an NG-C/U interface.

Alternatively, a base station and the core network may exist between the gateway 430 and the data network 440. In this case, the gateway 430 may be connected with the base station, the base station may be connected with the core network, and the core network may be connected with the data network 440. The base station and the core network may support the NR technology. The communications between the gateway 430 and the base station may be performed based on an NR-Uu interface, and the communications between the base station and the core network (e.g. AMF, UPF, SMF, and the like) may be performed based on an NG-C/U interface.

NTN reference scenarios may be defined as shown in Table 1 below.

TABLE 1

| | NTN shown in FIG. 1 | NTN shown in FIG. 2 |
|---|---|---|
| GEO | Scenario A | Scenario B |
| LEO (steerable beams) | Scenario C1 | Scenario D1 |
| LEO (beams moving with satellite) | Scenario C2 | Scenario D2 |

When the satellite 310 in the NTN shown in FIG. 3 is a GEO satellite (e.g. a GEO satellite that supports a transparent function), this may be referred to as 'scenario A'. When the satellites 411 and 412 in the NTN shown in FIG. 4 are GEO satellites (e.g. GEOs that support a regenerative function), this may be referred to as 'scenario B'.

When the satellite 310 in the NTN shown in FIG. 3 is an LEO satellite with steerable beams, this may be referred to as 'scenario C1'. When the satellite 310 in the NTN shown in FIG. 3 is an LEO satellite having beams moving with the satellite, this may be referred to as 'scenario C2'. When the satellites 411 and 412 in the NTN shown in FIG. 4 are LEO satellites with steerable beams, this may be referred to as 'scenario D1'. When the satellites 411 and 412 in the NTN shown in FIG. 4 are LEO satellites having beams moving with the satellites, this may be referred to as 'scenario D2'.

Parameters for the scenarios defined in Table 1 may be defined as shown in Table 2 below.

TABLE 2

| | Scenarios A and B | Scenarios C and D |
|---|---|---|
| Altitude | 35,786 km | 600 km<br>1,200 km |
| Spectrum (service link) | <6 GHz (e.g. 2 GHz)<br>>6 GHz (e.g. DL 20 GHz, UL 30 GHz) | |
| Maximum channel bandwidth capability (service link) | 30 MHz for band <6 GHz<br>1 GHz for band >6 GHz | |
| Maximum distance between satellite and communication node (e.g. UE) at the minimum elevation angle | 40,581 km | 1,932 km (altitude of 600 km)<br>3,131 km (altitude of 1,200 km) |
| Maximum round trip delay (RTD) (only propagation delay) | Scenario A: 541.46 ms (service and feeder links)<br>Scenario B: 270.73 ms (only service link) | Scenario C: (transparent payload: service and feeder links) −5.77 ms (altitude of 60 0 km) −41.77 ms (altitude of 1,200 km)<br>Scenario D: (regenerative payload: only service link) −12.89 ms (altitude of 600 km) −20.89 ms (altitude of 1,200 km) |
| Maximum delay variation within a single beam | 16 ms | 4.44 ms (altitude of 600 km)<br>6.44 ms (altitude of 1,200 km) |
| Maximum differential delay within a cell | 10.3 ms | 3.12 ms (altitude of 600 km)<br>3.18 ms (altitude of 1,200 km) |
| Service link | NR defined in 3GPP | |
| Feeder link | Radio interfaces defined in 3GPP or non-3GPP | |

In addition, in the scenarios defined in Table 1, delay constraints may be defined as shown in Table 3 below.

TABLE 3

| | Scenario A | Scenario B | Scenario C1-2 | Scenario D1-2 |
|---|---|---|---|---|
| Satellite altitude | 35,786 km | | 600 km | |
| Maximum RTD in a radio interface between base station and UE | 541.75 ms (worst case) | 270.57 ms | 28.41 ms | 12.88 ms |
| Minimum RTD in a radio interface between base station and UE | 477.14 ms | 238.57 ms | 8 ms | 4 ms |

Meanwhile, a multi-antenna may be used to utilize the characteristics (e.g. advantages) of radio channels in a communication system. By adjusting a phase and amplitude of each antenna element of a multi-transmission antenna, the total transmission power may be concentrated in a specific direction (e.g. specific beam). In other words, a specific beam may be formed by adjusting the phases and amplitudes of the respective antenna elements of the multi-transmission antenna. The beam may be a directional beam. When a multi-reception antenna is used, external interference signals can be reduced and a transmitter's signal can be focused at a receiver.

In the 5G communication network (e.g. NR communication network), frequency ranges may be classified according to the characteristics of radio channels. Depending on a frequency range, units of radio resources (e.g. time resources and/or frequency resources) may be defined, and a multi-antenna transmission scheme may be used. The frequency range may be classified into a frequency range 1 (FR1) and a FR2. The FR1 may be 410~7125 MHz. The FR2 may be 24.25~52.6 GHz. In the FR1 and/or FR2, multiple-input multiple-output (MIMO) transmission schemes may be used depending on frequency characteristics.

A communication network beyond the 5G communication network may use a frequency (e.g. carrier frequency) higher than the FR2. As the frequency used becomes higher, a wider frequency bandwidth can be used. Transmission of a large amount of data may be possible over a wide frequency bandwidth. However, a difference in radio wave characteristics may be large depending on the frequency.

When electromagnetic waves encounter an obstacle in a low-frequency radio channel environment such as the FR1, the electromagnetic waves may propagate through multiple paths due to a diffraction phenomenon. In a high frequency radio channel environment such as the FR2, a communication range between a transmitter and a receiver may be reduced due to a high propagation loss. Additionally, since electromagnetic waves have low diffraction characteristics in the high frequency radio channel environment, when the electromagnetic waves encounter an obstacle, the propagation of the electromagnetic waves may be blocked. In other words, at a high frequency (e.g. FR2), multiple paths due to diffraction of the electromagnetic waves may not be formed.

At a low frequency (e.g. FR1), multiple paths may be formed in a radio channel environment between a transmitter and a receiver, macro cell communication may be possible because a communication range between the transmitter and receiver is long, and a frequency bandwidth may be narrow. At a high frequency (e.g. FR2), multiple paths may not be formed in a radio channel environment between a transmitter and a receiver, the radio channel environment may have line of sight (LOS) characteristics, a communication range between the transmitter and the receiver may be short, small cell communications etc. may be possible, and a frequency bandwidth may be wide.

To expand coverage (e.g. increase communication range) in the 5G communication network supporting the FR2, a base station may transmit synchronization signal bocks (SSBs) based on a beam sweeping scheme. The SSB may be referred to as a synchronization signal/physical broadcast channel (SS/PBCH) block. A terminal may receive SSB(s) through swept beam(s) of the base station, select one SSB based on a measurement result of the SSB(s), identify a beam associated with the selected one SSB, and report information of the identified beam to the base station. To compensate for a high propagation loss of the FR2, energy may be concentrated in the beam reported by the terminal.

While communication is performed using the beam formed in the FR2, a beam management procedure may be defined to adapt to environmental changes in the radio channel. In the beam management procedure, an initial beam may be configured, the beam may be adjusted based on changes due to a mobility and/or rotation of the terminal, and if a beam failure occurs due to a sudden change in the environment, the beam may be recovered.

In the initial beam configuration procedure, the base station may repeatedly transmit SSBs according to beam directions, the terminal may acquire time synchronization based on a synchronization signal included in an SSB to access a cell, and the terminal may obtain information (e.g. system information) from a PBCH included in the SSB. In the initial beam configuration procedure, the terminal may select an optimal SSB by performing a measurement operation on SSBs and transmit an RA preamble to the base station in a random access channel (RACH) occasion associated with the optimal SSB. The RACH occasion in which the RA preamble is transmitted may indicate a beam in which the SSB associated with the RACH occasion is received (or transmitted). The base station may receive the RA preamble from the terminal in the specific RACH occasion and may identify a transmission beam of the SSB associated with the specific RACH occasion in which the RA preamble is received.

Figure 5:
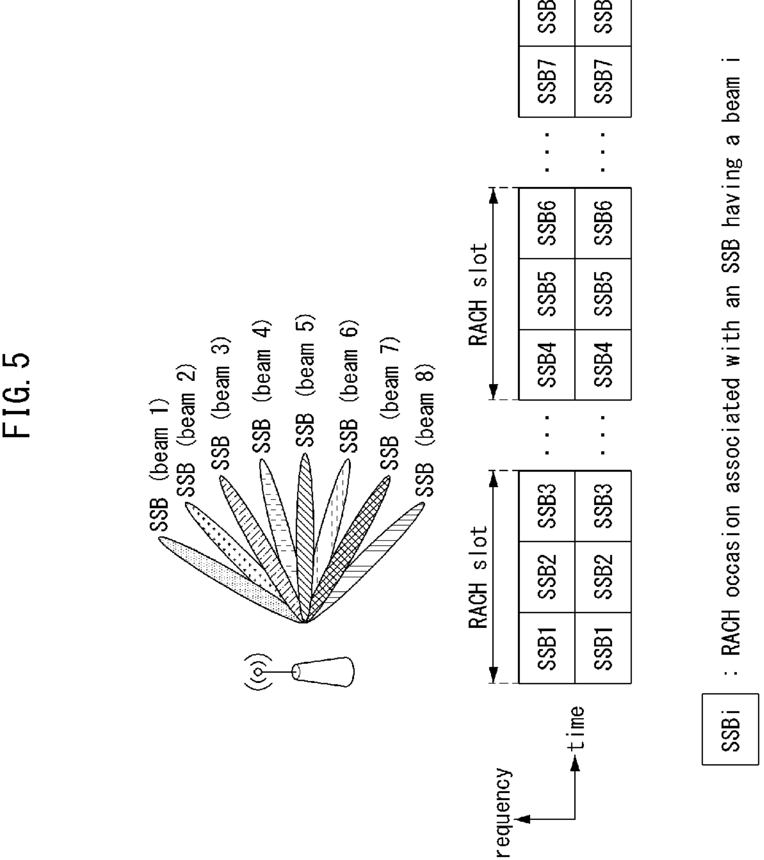
FIG. 5 is a conceptual diagram illustrating an initial beam configuration procedure.

FIG. 5 is a conceptual diagram illustrating an initial beam configuration procedure.

Referring to FIG. 5, the base station may transmit SSBs based on a beam sweeping scheme. An SSBi may mean an SSB transmitted through a beam i. i may be a natural number. The terminal may receive SSBs from the base station, measure a reception quality (e.g. reference signal received power (RSRP)) for each of the SSBs, and select an SSB with an RSRP equal to or greater than an RSRP threshold among the SSBs. For example, the terminal may select an SSB with the largest RSRP. The terminal may transmit an RA preamble (e.g. Msg1 or MsgA) to the base station in a RACH occasion (e.g. RACH occasion within a RACH slot) associated with the selected SSB. The base station may receive the RA preamble from the terminal in the specific RACH occasion and identify the transmission beam of the SSB associated with the specific RACH occasion in which the RA preamble is received. An initial beam may be configured by the initial beam configuration procedure. For example, the initial beam may mean a pair of the base station's transmission beam and the terminal's reception beam.

After the initial beam is configured, beam adjustment may be necessary due to the mobility of the terminal, rotation of the terminal, and/or changes in the radio channel environment. In a beam adjustment procedure, the terminal may perform a measurement operation and a measurement reporting operation for channel state information-reference signals (CSI-RS). If signaling for the beam management procedure and tracking of a narrow beam fail, a beam recovery procedure may be triggered. In other words, the terminal may perform the beam recovery procedure when a beam error or beam failure is detected.

When a beam error or beam failure is detected, the terminal may perform the beam recovery procedure. In the beam recovery procedure, the terminal may identify new candidate beam(s) and transmit a beam recovery request for the new candidate beam(s) to the base station. The base station may receive the beam recovery request from the terminal and may respond to the beam recovery request.

To detect a beam error or beam failure, the terminal may measure RSRPs for reference signals configured as an SSB set or a CSI-RS set. By comparing measured RSRPs with an RSRP threshold, the terminal may determine whether a beam error or beam failure has occurred. If it is determined that a beam error or beam failure has occurred, the terminal may search for new candidate beam(s). The SSB set may include one or more SSBs, and the CSI-RS set may include one or more CSI-RSs.

The terminal may proactively perform the beam recovery procedure. In the beam recovery procedure, the terminal may transmit an RA preamble for the beam recovery request to the base station and receive a random access response (RAR) (e.g. Msg2 or MsgB) from the base station in response to the RA preamble. The RA preamble may include information on a candidate beam group. For example, a RACH occasion in which the RA preamble is transmitted may be associated with the candidate beam group (e.g. reference signal(s) (e.g. CSI-RS(s)) received through candidate beam(s)). The candidate beam group may include one or more candidate beams. An association between RACH occasion and CSI-RS may not be configured. In this case, a RACH occasion associated with an SSB having a quasi-colocation (QCL) relationship with a CSI-RS may be used. A mapping relationship between an RA preamble and a candidate beam may not exist.

The base station may receive the RA preamble from the terminal, and identify the candidate beam group based on the RA preamble. For example, the base station may identify a reference signal (e.g. CSI-RS) associated with the RACH occasion in which the RA preamble is received, and may identify a beam through which the identified reference signal is transmitted as a candidate beam.

Meanwhile, the 5G communication network can support URLLC services. The URLLC requirements may be defined to support usage scenarios such as augmented reality and virtual reality in the entertainment industry, remote driving in the transportation industry, power distribution, and the like. The URLLC requirements in the 5G communication network supporting Rel-15 may be defined as follows.

Latency for data with a size of 32 bytes in uplink and downlink: 1 ms

Block error rate (BLER): $10^{-5}$

The URLLC requirements in the 5G communication network supporting Rel-16 may be defined as follows.

Latency for data with a size of 32 bytes in uplink and downlink: 0.5~1 ms

BLER: $10^{-6}$

When the conventional beam recovery procedure (e.g. transmission and reception procedure of RA preamble and RAR) is performed in the communication network supporting URLLC services, the URLLC requirements may not be satisfied. In the communication network, the base station may transmit a PDCCH (e.g. downlink control information (DCI)) without beam sweeping. In the communication network supporting a high frequency band, if a DCI for RAR or paging is transmitted without beam sweeping, the terminal (e.g. terminal in an RRC idle state or RRC inactive state) may not receive the DCI for RAR or paging. In this case, the terminal may not receive beam recovery-related information, paging early indicator (PEI), and/or paging information.

The present disclosure provides a quick error reporting scheme (e.g. quick failure reporting scheme) in a beam recovery procedure for a terminal in the RRC connected state or RRC non-connected state. In this case, a latency of beam recovery can be reduced, and occurrences of beam errors (or beam failures) in signals/channels to which a beam sweeping operation is not applied can be reduced. In particular, occurrences of beam errors (or beam failures) in a terminal in the RRC non-connected state can be reduced. The RRC non-connected state may mean the RRC idle state and/or RRC inactive state.

For a beam recovery procedure for a beam error (or beam failure) between the base station and the terminal in the communication network supporting high frequency bands such as mmWave, THz, or the like, the base station may transmit a beam recovery early indicator (BREI) using a beam sweeping scheme. The BREI may be used for beam management or beam recovery. In the present disclosure, the beam recovery procedure may be proactively performed by the base station.

The base station may inform terminals (e.g. terminals in the RRC connected state) in advance of configuration information of a BREI (i.e. BREI configuration information) to be used in the beam recovery procedure through signaling. The terminal may receive the BREI configuration information from the base station. The BREI configuration information may include a BREI-radio network temporary identifier (BREI-RNTI), and the like, and may be transmitted to the terminal through signaling. In the present disclosure, signaling may be at least one of SI signaling, RRC signaling, MAC signaling (e.g. MAC CE signaling), or PHY signaling.

The base station may monitor whether a beam error or beam failure occurs. When preconfigured condition(s) are satisfied, the base station may determine that a beam error or beam failure has occurred. If a beam error or beam failure is detected, the base station may transmit a BREI to the terminal. The BREI may be transmitted on a PDCCH. In other words, a DCI including the BREI may be transmitted.

The terminal may perform a monitoring operation on a search space (e.g. search space set). The monitoring operation may include a blind decoding operation. Upon receiving the BREI, the terminal may determine that a beam error or beam failure has occurred at the base station. In other words, the terminal may determine that a beam recovery procedure is required (or to be performed). The terminal may determine that a beam error or beam failure has occurred in a beam (e.g. beam pair) configured between the terminal and the base station. The terminal may transmit a response to the BREI (hereinafter referred to as 'BREI response') to the base station on a physical uplink control channel (PUCCH) or a physical uplink shared channel (PUSCH). The base station may receive the BREI response from the terminal on the PUCCH or PUSCH. Resource allocation information for transmission of the BREI response (e.g. PUCCH resource and/or PUSCH resource) and/or resource allocation information of an SRS may be transmitted to the terminal through signaling.

The BREI may be a BREI-radio network temporary identifier (BREI-RNTI) itself or may be transmitted using the BREI-RNTI. Information on the BREI-RNTI may be transmitted to the terminal through signaling. For example, the base station may transmit BREI configuration information including information on the BREI-RNTI to the terminal. When a beam error or beam failure is detected, the base station may transmit a DCI (hereinafter referred to as 'BREI DCI') with a cyclic redundancy check (CRC) scrambled by the BREI-RNTI to the terminal. The BREI DCI may mean a DCI including the BREI. The BREI DCI may be transmitted based on a beam sweeping scheme. The BREI DCI may include resource allocation information for transmission of a BREI response (e.g. PUCCH resource and/or PUSCH resource) and/or resource allocation information of an SRS. In the present disclosure, the DCI may be interpreted as the existing DCI, BREI DCI, or paging DCI depending on a context.

FIG. 6 is a conceptual diagram illustrating a BREI transmission method based on a beam sweeping scheme.

Referring to FIG. 6, the base station may transmit a BREI (e.g. BREI DCI) to the terminal based on a beam sweeping scheme. In other words, the DCI (e.g. BREI DCI) may be transmitted repeatedly. To support the repeated transmission of the BREI, the base station may transmit information indicating that DCI repeated transmission is enabled to the terminal through signaling. The terminal may confirm that the DCI repeated transmission is enabled through signaling from the base station, and may perform a monitoring operation on a search space to receive the repeated transmission of the DCI. The search space for the DCI repeated transmission may be distinguished from the existing search space. The search space for the DCI repeated transmission may be configured in the terminal through signaling.

The BREI may be transmitted in a BREI occasion (e.g. search space). The BREI occasions may be distinguished in the time domain and/or frequency domain. In other words, the BREI occasions may be multiplexed in the time domain and/or frequency domain. The BREI DCI may include resource allocation information of a PUCCH and/or resource allocation information of an SRS for transmission of a response to the BREI.

The terminal may receive the BREI (e.g. BREI DCI, repeated BREI DCI) from the base station. The terminal may transmit a response to the BREI to the base station on a PUCCH or PUSCH. The base station may receive the response to the BREI from the terminal on the PUCCH or PUSCH. The resource allocation information for the PUCCH or PUSCH on which the response to the BREI is transmitted may be included in the BREI DCI. The resource allocation information of the PUCCH may indicate multiple PUCCH resources. The resource allocation information of the PUSCH may indicate multiple PUSCH resources. The resource allocation information of the PUCCH (or PUSCH) may include information of a mapping relationship (e.g. association relationship) between PUCCH resources (or PUSCH resources) and beams.

Figure 7:
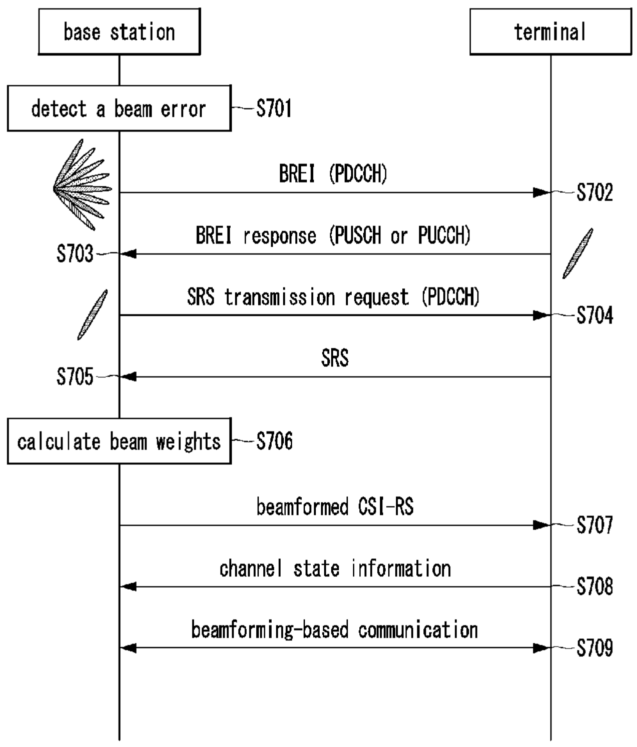
FIG. 7 is a sequence chart illustrating an early beam recovery procedure.

FIG. 7 is a sequence chart illustrating an early beam recovery procedure.

Referring to FIG. 7, the base station may transmit configuration information of an early beam recovery procedure to the terminal through signaling. The terminal may receive the configuration information of the early beam recovery procedure through signaling from the base station. The early beam recovery procedure may be initiated by the base station. In other words, the base station may proactively perform the early beam recovery procedure. The configuration information of the early beam recovery procedure may include an enable/disable indicator, BREI configuration information, DCI repetition indicator, and/or BREI search space information. The enable/disable indicator may indicate that the early beam recovery procedure is enabled or disabled. When the early beam recovery procedure is enabled, the base station may initiate the early beam recovery procedure when a beam error or beam failure is detected, and the terminal may perform a monitoring operation on a search space to receive the BREI (e.g. BREI DCI). When the early beam recovery procedure is disabled, the base station may not initiate the early beam recovery procedure, and the terminal may not perform a monitoring operation on the search space to receive the BREI (e.g. BREI DCI). The BREI configuration information may include the BREI-RNTI, or the like. The DCI repetition indicator may indicate that repeated transmission of DCI (e.g. BREI DCI) is performed. The BREI search space information may indicate a search space in which repeated transmission of DCI (e.g. BREI DCI) is performed.

The base station may detect whether a beam error or beam failure has occurred (S701). For example, when an uplink signal/channel (e.g. uplink transmission) is not received from the terminal, the base station may determine that a beam error or beam failure has occurred. The uplink transmission may include at least one of PUSCH transmission, PUCCH transmission, physical random access channel (PRACH) transmission, or SRS transmission. When failures of receiving uplink transmissions occur more than M times or when failures of receiving uplink transmissions occur more than M times during a preset time T, the base station may determine that a beam error or beam failure has occurred. M may be a natural number.

For example, the base station may transmit a UL DCI to the terminal and may not receive data from the terminal on a PUSCH scheduled by the UL DCI. In other words, a PUSCH reception failure may occur. If the number of occurrences of the PUSCH reception failure is equal to or greater than M, the base station may determine a beam error or beam failure. Alternatively, if the number of occurrences of the PUSCH reception failure is equal to or greater than M times during a preset time T, the base station may determine a beam error or beam failure.

For another example, the base station may configure a configured grant (CG) PUSCH to the terminal, and may not receive data from the terminal on the CG PUSCH. In other words, a reception failure of the CG PUSCH may occur. When the number of occurrences of the CG PUSCH reception failure is equal to or greater M, the base station may determine a beam error or beam failure. Alternatively, when the number of occurrences of the CG PUSCH reception failure is equal to or greater than M times during a preset time T, the base station may determine a beam error or beam failure.

For another example, the base station may transmit a DL DCI to the terminal, transmit data to the terminal on a PDSCH scheduled by the DL DCI, and may not receive a hybrid automatic repeat request-acknowledgement (HARQ-ACK) for the data from the terminal on a PUCCH. In other words, a PUCCH reception failure may occur. When the number of occurrences of the PUCCH reception failure is equal to or greater than M, the base station may determine a beam error or beam failure. Alternatively, when the number of occurrences of the PUCCH reception failure is equal to or greater than M during a preset time T, the base station may determine a beam error or beam failure.

For another example, the base station may configure (e.g. request) SRS transmission to (from) the terminal. The base station may not receive an SRS from the terminal on an SRS resource. In other words, a SRS reception failure may occur. When the number of occurrences of the SRS reception failure is equal to or greater than M, the base station may determine a beam error or beam failure. Alternatively, when the number of occurrences of the SRS reception failure is equal to or greater than M during a preset time T, the base station may determine a beam error or beam failure.

When a beam error or beam failure is detected (e.g. an (early) beam recovery procedure is determined to be required), the base station may transmit a BREI to the terminal (S702). The base station may transmit the BREI to the terminal based on a beam sweeping scheme. For example, the base station may transmit the BREI to the terminal based on the method shown in FIG. 6. The BREI may indicate that the (early) beam recovery procedure is initiated. In other words, the base station may initiate the (early) beam recovery procedure by transmitting the BREI to the terminal. The BREI may be a BREI DCI. The BREI DCI may include resource allocation information of an uplink channel (e.g. PUSCH or PUCCH) for transmission of a response to the BREI (e.g. BREI response). In addition, the BREI DCI may include information indicating an SRS request (e.g. SRS transmission request). In addition, the BREI DCI may include at least one of information indicating that the BREI DCI is repeatedly transmitted, a repetition transmission interval of the BREI DCI, or the number of repeated transmissions of the BREI DCI. The repeated BREI DCIs may include the same information element(s).

The terminal may receive the BREI (e.g. BREI DCI, repeated BREI DCIs) from the base station. The terminal may detect the BREI DCI by performing a blind decoding operation based on the BREI-RNTI. Upon receiving the BREI (e.g. BREI DCI), the terminal may determine that a beam error or beam failure has been detected at the base station. For example, the terminal may determine that a beam error or beam failure has occurred for a beam configured between the terminal and the base station. Since the BREI DCI is transmitted based on a beam sweeping scheme, the terminal may receive one or more BREI DCIs. The terminal may determine a beam in which a BREI DCI with the best reception quality (e.g. largest RSRP) is received among the one or more BREI DCIs as a preferred beam. Alternatively, the terminal may select at least one BREI DCI with an RSRP equal to or greater than an RSRP threshold among the one or more BREI DCIs, and may determine a beam in which one BREI DCI (e.g. one BREI DCI with an optimal RSRP) among the at least one BREI DCI is received as a preferred beam.

Upon receiving the BREI (e.g. BREI DCI), the terminal may determine that an (early) beam recovery procedure is initiated. The terminal may transmit a BREI response to the base station on an uplink channel (e.g. PUSCH or PUCCH) scheduled by the BREI (e.g. BREI DCI) (S703). In the step S703, the terminal may transmit the BREI response to the base station using the preferred beam. The base station may receive the BREI response from the terminal. The base station may determine that the beam in which the BREI response of the terminal is received as the preferred beam. A specific exemplary embodiment of S703 may be as follows.

Figure 8:
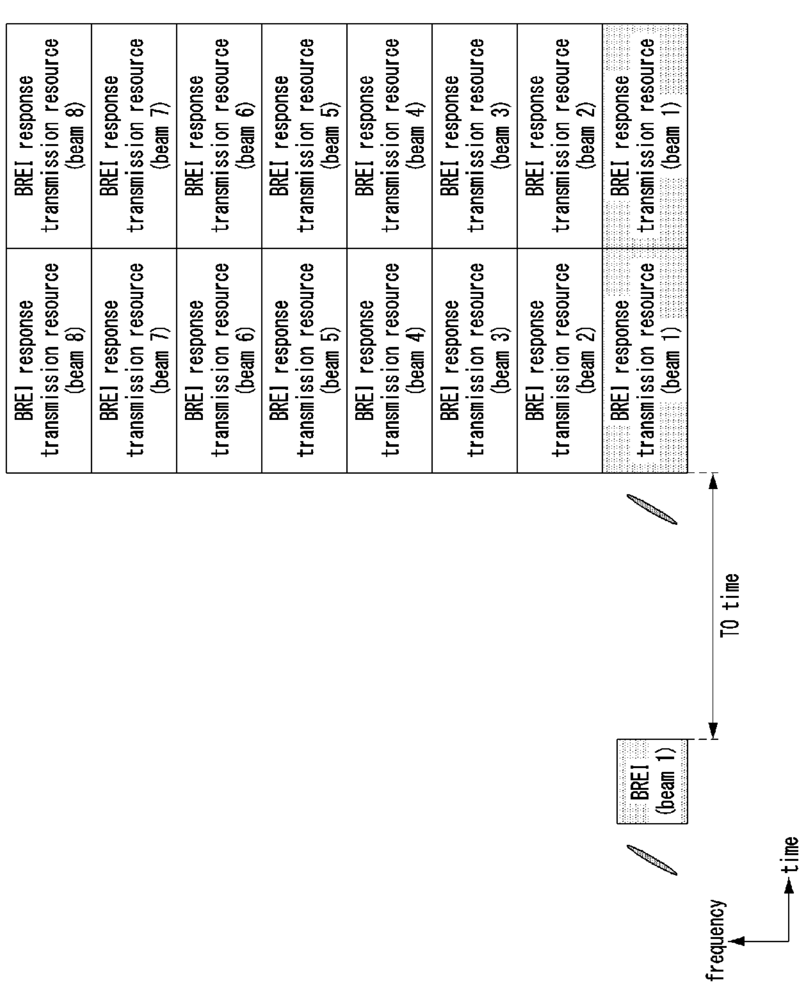
FIG. 8 is a conceptual diagram illustrating a method for transmitting and receiving a BREI response.

FIG. 8 is a conceptual diagram illustrating a method for transmitting and receiving a BREI response.

Referring to FIG. 8, the terminal may receive a BREI (e.g. BREI DCI) from the base station, and may transmit a BREI response to the base station in response to the BREI. The BREI transmission/reception operation may be performed as in the step S702 of FIG. 7, and the BREI response transmission/reception operation may be performed as in the step S703 of FIG. 7. The terminal may transmit the BREI response to the base station using a preferred beam within or after a TO time from a reception time of the BREI. For example, the terminal may receive BREIs through a plurality of beams, and may determine a beam in which a BREI with the best quality (e.g. largest RSRP) is received (or transmitted) as the preferred beam, and may transmit the BREI response using the preferred beam.

Information on the TO time and/or the transmission resource information of the BREI response may be transmitted to the terminal through signaling. For example, the BREI (e.g. BREI DCI) may include information of the TO time and/or transmission resource information of the BREI response. A transmission resource for the BREI response may be configured for each beam. For example, a transmission resource of a BREI response associated with a beam 1 (e.g. beam index 1) may be configured to be distinct from a transmission resource of a BREI response associated with a beam 2 (e.g. beam index 2). When the preferred beam is determined to be the beam 1, the terminal may transmit the BREI response to the base station in a transmission resource associated with the beam 1 among the transmission resources configured by the base station. A transmission resource of the BREI response may be a PUCCH resource or a PUSCH resource. The BREI response may be transmitted repeatedly on PUCCH resources or PUSCH resources.

The base station may receive the BREI response from the terminal by monitoring on BREI response transmission resources. The base station may determine that a beam associated with a transmission resource in which the BREI response of the terminal is received among the BREI response transmission resources is the preferred beam of the terminal.

Referring again to FIG. 7, after information on the preferred beam is exchanged between the base station and the terminal, communication between the base station and the terminal may be performed using the preferred beam. After receiving the BREI response, the base station may transmit a DCI requesting SRS transmission to the terminal (S704). In the step S704, the base station may transmit the DCI to the terminal using a preferred beam (e.g. the base station's transmission beam corresponding to the terminal's preferred beam).

The terminal may receive the DCI from the base station. The DCI may be received through the terminal's preferred beam. The terminal may identify that SRS transmission is requested based on information element(s) included in the DCI. The terminal may transmit an SRS to the base station at the request of the base station (S705). The SRS may be transmitted using the terminal's preferred beam. The SRS may be generated based on a Zadoff-chu sequence. The SRS may include information on an uplink beam (e.g. uplink beam index). The uplink beam may correspond to the terminal's preferred beam. If the BREI DCI received in the step S702 includes SRS request information, the step S704 may be omitted. In this case, the terminal may transmit an SRS to the base station after transmitting the BREI response.

SRS resources may be preconfigured by the base station. The base station may allocate SRS resources for each terminal. In addition, the base station may allocate SRS resources having different frequency resources according to beam indices to the terminal. In this case, the terminal may transmit an SRS to the base station on an SRS resource corresponding to the terminal's transmission beam (e.g. preferred beam, uplink beam).

The base station may receive the SRS from the terminal and perform a measurement operation on the SRS. The base station may generate channel state information by performing the measurement operation on the SRS. The base station may calculate (e.g. determine) beamforming weights based on a measurement result of the SRS (S706). The base station may perform beamforming for a CSI-RS by reflecting the beamforming weights (S707). In other words, the base station may transmit the CSI-RS to the terminal based on a beamforming scheme.

The terminal may receive the CSI-RS (e.g. beamformed CSI-RS) from the base station, and may generate channel state information (e.g. CSI-RS resource indicator (CRI), a precoding matrix indicator (PMI), a rank indicator (RI), a layer indicator (LI), channel quality information (CQI), and/or RSRP) by performing a measurement operation on the CSI-RS (e.g. beamformed CSI-RS). The terminal may report the channel state information to the base station (S708). The base station may receive the channel state information from the terminal. The base station may perform communication with the terminal based on the channel state information (S709). In the step S709, a signal/channel may be transmitted and received based on the channel state information. In other words, in the step S709, the signal/channel may be transmitted using beamforming. The signal/channel may include a downlink signal/channel and/or an uplink signal/channel. The downlink signal/channel may include an SSB, downlink reference signal (e.g. CSI-RS, demodulation-reference signal (DM-RS), phase tracking (PT)-RS, etc.) and/or downlink channel (e.g. PDCCH, PDSCH, etc.). The uplink signal/channel may include an uplink reference signal (e.g. SRS, etc.) and/or an uplink channel (e.g. PUCCH, PUSCH, etc.).

Figure 9:
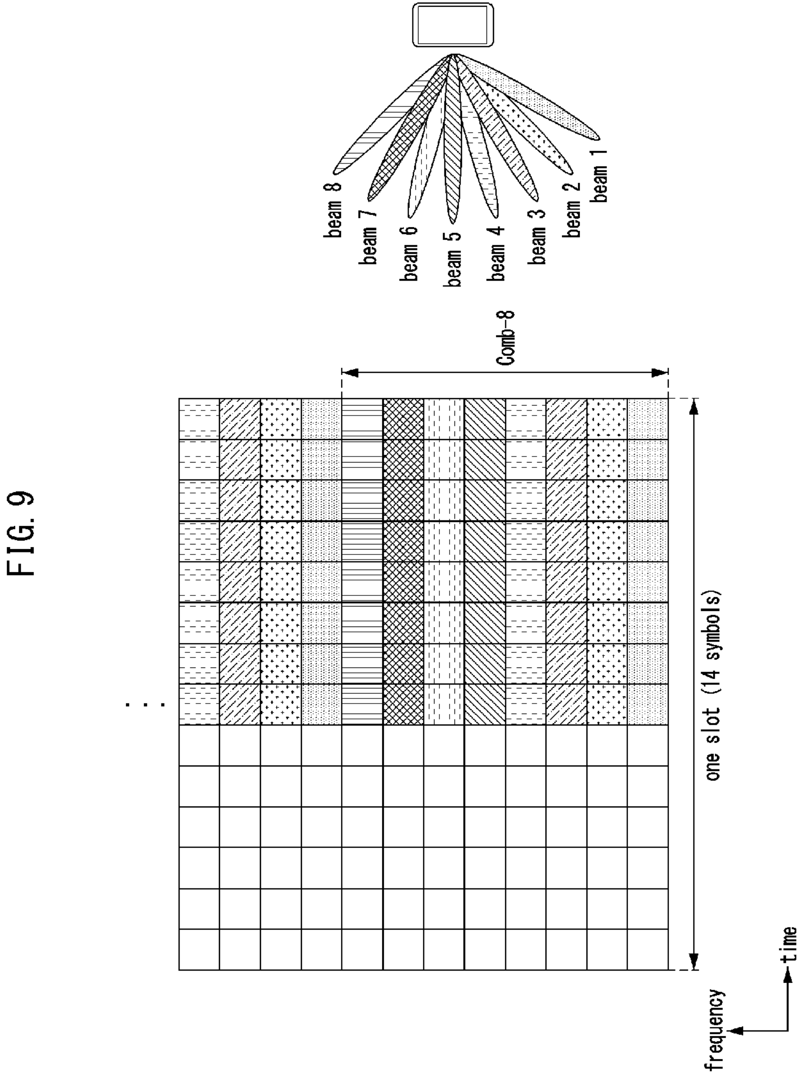
FIG. 9 is a conceptual diagram illustrating a set of SRS antenna ports.

FIG. 9 is a conceptual diagram illustrating a set of SRS antenna ports.

Referring to FIG. 9, an SRS antenna port may be configured for each beam. When 8 beams are used, 8 SRS antenna ports may be configured. For example, an SRS antenna port 1 for a beam 1 and an SRS antenna port 2 for a beam 2 may be distinguished in the frequency domain. Information on the SRS antenna ports may be configured by the base station to the terminal through signaling. The SRS may be transmitted using n symbols, and n may be a natural number. For example, n may be 8. The SRS may be generated based on a Zadoff-chu sequence. Frequency resources of the SRS may be configured for the respective beams. Configuration of a root index and/or cyclic shifts of the Zadoff-chu sequence may vary for each terminal. The base station may identify the terminal that transmitted the SRS based on a root index and a cyclic shift of the Zadoff-chu sequence applied to the received SRS. The Zadoff-chu sequence $$z_i^u$$

for the SRS may be defined as Equation 1 below.

$$z_i^u = e^{-j\frac{\pi u i(i+1)}{M}};\ 0 \le i < M \quad \text{[Equation 1]}$$

M may be the length of the radio resource of the SRS (e.g. the number of symbols). u may be the root index. M and u may be relatively prime numbers. If the length of the Zadoff-chu sequence is M, there may be M−1 unique Zadoff-chu sequences. The number of root indices u may correspond to an integer that is a relatively prime number for M. Based on the above characteristic, the Zadoff-chu sequence of the length M with the root index u may be obtained by performing an autocorrelation operation for M−1 sequences (e.g. M−1 Zadoff-chu sequences). The Zadoff-chu sequence of the length M that satisfies 'a result of the autocorrelation operation for M−1 sequences=0' may be obtained.

The terminal may transmit an SRS generated based on the M-length Zadoff-chu sequence to the base station. The base station may receive the SRS from the terminal and obtain M by performing an autocorrelation operation on the Zadoff-chu sequence of the SRS. When the root index u is selected as a new value and/or when a cyclic shift is applied, a new Zadoff-chu sequence may be obtained. Accordingly, the base station may use the root index u and/or the cyclic shift to identify the terminal.

Figure 10:
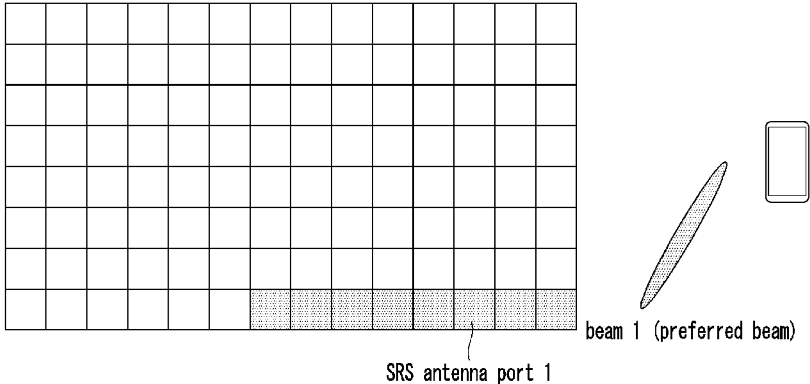
FIG. 10 is a conceptual diagram illustrating an SRS transmission method.

FIG. 10 is a conceptual diagram illustrating an SRS transmission method.

Referring to FIG. 10, when the preferred beam is the beam 1, the terminal may identify an SRS resource (e.g. SRS antenna port 1) associated with the beam 1, and transmit the SRS to the base station using the beam 1 in the identified SRS resource. The above operation may be applied to the step S705 (e.g. SRS transmission operation) of FIG. 7.

Figure 11:
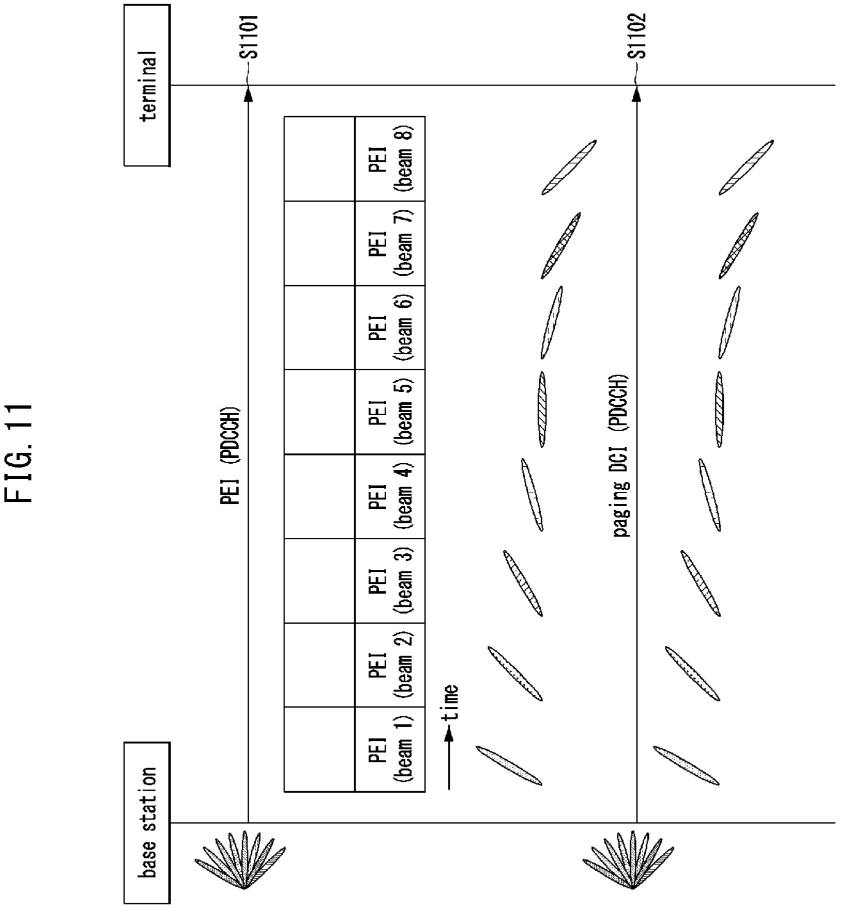
FIG. 11 is a sequence chart illustrating a method of transmitting a paging early indicator (PEI).

FIG. 11 is a sequence chart illustrating a method of transmitting a paging early indicator (PEI).

Referring to FIG. 11, in a communication network supporting high frequency bands such as mmWave, THz, or the like, the base station may transmit a PDCCH (e.g. PEI DCI) to the terminal (e.g. a terminal in the RRC non-connected state) based on a beam sweeping scheme (S1101). The PEI DCI may mean a DCI including the PEI. When the terminal is in the RRC non-connected state (e.g. RRC idle state or RRC inactive state), the base station may not know information on a beam direction between the terminal and the base station. In the communication network supporting high frequency bands such as mmWave, THz, or the like, the base station may not be able to transmit signals/channels using omnidirectional beams. Accordingly, the base station may transmit the PEI (e.g. PEI DCI) based on a beam sweeping scheme. In other words, the PEI DCI may be transmitted repeatedly.

The terminal may receive the PEI (e.g. PEI DCI) from the base station. When the PEI is received, the terminal may perform a monitoring operation to receive a paging signal in a next paging occasion (PO). When the PEI is not received, the terminal may not perform a monitoring operation to receive a paging signal in the next PO.

After transmitting the PEI, the base station may transmit a paging DCI in a PO (e.g. next PO) (S1102). The base station may transmit the paging DCI based on a beam sweeping scheme. In other words, the paging DCI may be transmitted repeatedly. After transmitting the paging DCI, the base station may transmit a paging message on a PDSCH indicated by the paging DCI. The terminal receiving the PEI may receive the paging DCI from the base station in the PO, and may receive the paging message on the PDSCH indicated by the paging DCI.

To support the above-described operation, the base station may transmit paging configuration information to the terminal through signaling (e.g. SI signaling). The paging configuration information may include information indicating whether to use PEI, transmission resource information of PEI, repeated transmission-related information of PEI, repeated transmission-related information of paging DCI, and/or PO configuration information. The steps S1101 and S1102 may be performed based on the paging configuration information.

Meanwhile, in the conventional beam recovery procedure, the terminal may detect a beam error or beam failure, and perform a beam recovery procedure when the beam error or beam failure is detected. In other words, the conventional beam recovery procedure may be initiated by the terminal rather than the base station. In the conventional beam recovery procedure, an RA preamble and an RAR may be used. RACH configuration information may be transmitted to the terminal through signaling. Dynamically allocating and/or managing resources for the conventional beam recovery procedure may be difficult. In other words, the RACH configuration information may be signaled through an RRC message, and it may be difficult to dynamically and quickly allocate and/or manage resources for the beam recovery procedure using the RRC message.

In an exemplary embodiment of the present disclosure, the base station may detect a beam error or beam failure, and when the beam error or beam failure is detected, the base station may transmit a BREI (e.g. BREI DCI) to the terminal in a beam sweeping scheme. Since the BREI is dynamically signaled by a PHY message (e.g. DCI), a BREI DCI-based beam recovery procedure can be performed quickly. In other words, a beam recovery time according to the BREI DCI-based beam recovery procedure may be shorter than a beam recovery time according to the conventional beam recovery procedure (e.g. RACH-based beam recovery procedure).

According to the conventional method, only a terminal may initiate a beam recovery procedure. Therefore, even when the base station detects a beam error or beam failure, the base station should wait until the terminal initiates a beam recovery procedure. In the conventional method, the more RACH resources (e.g. RA preamble transmission resources) for the beam recovery procedure are allocated, the faster the beam recovery procedure can be performed. Since RACH resources allocated for the beam recovery procedure cannot be used for other purposes, the efficiency of resource use may be reduced. In other words, since RACH resources are static or semi-persistent resources, if many RACH resources are configured, the efficiency of resource use may decrease.

According to the BREI DCI-based beam recovery procedure according to an exemplary embodiment of the present disclosure, a transmission resource of the BREI DCI is not configured in advance, but can be configured only when a beam error or beam failure is detected. In other words, since the transmission resource of the BREI DCI is a dynamic resource rather than a static or semi-persistent resource, the efficiency of resource use can be improved. In an exemplary embodiment of the present disclosure, the base station may transmit a PDCCH to the terminal in the RRC non-connected state based on a beam sweeping scheme. In this case, a probability that the terminal in the RRC non-connected state does not receive the PDCCH can be reduced.

The operations of the method according to the exemplary embodiment of the present disclosure can be implemented as a computer readable program or code in a computer readable recording medium. The computer readable recording medium may include all kinds of recording apparatus for storing data which can be read by a computer system. Furthermore, the computer readable recording medium may store and execute programs or codes which can be distributed in computer systems connected through a network and read through computers in a distributed manner.

The computer readable recording medium may include a hardware apparatus which is specifically configured to store and execute a program command, such as a ROM, RAM or flash memory. The program command may include not only machine language codes created by a compiler, but also high-level language codes which can be executed by a computer using an interpreter.

Although some aspects of the present disclosure have been described in the context of the apparatus, the aspects may indicate the corresponding descriptions according to the method, and the blocks or apparatus may correspond to the steps of the method or the features of the steps. Similarly, the aspects described in the context of the method may be expressed as the features of the corresponding blocks or items or the corresponding apparatus. Some or all of the steps of the method may be executed by (or using) a hardware apparatus such as a microprocessor, a programmable computer or an electronic circuit. In some embodiments, one or more of the most important steps of the method may be executed by such an apparatus.

In some exemplary embodiments, a programmable logic device such as a field-programmable gate array may be used to perform some or all of functions of the methods described herein. In some exemplary embodiments, the field-programmable gate array may be operated with a microprocessor to perform one of the methods described herein. In general, the methods are preferably performed by a certain hardware device.

The description of the disclosure is merely exemplary in nature and, thus, variations that do not depart from the substance of the disclosure are intended to be within the scope of the disclosure. Such variations are not to be regarded as a departure from the spirit and scope of the disclosure. Thus, it will be understood by those of ordinary skill in the art that various changes in form and details may be made without departing from the spirit and scope as defined by the following claims.

What is claimed is:

1. A method of a base station, comprising:

detecting a beam failure for a terminal;

in response to detecting the beam failure, transmitting a downlink control information (DCI) including a beam recovery early indicator (BREI), information on a first BREI response resource mapped to a first beam, and information on a second BREI response resource mapped to a second beam to the terminal based on a beam sweeping scheme;

receiving a BREI response in the first BREI response resource and the second BREI response resource from the terminal; and determining as a preferred beam of the terminal, a beam mapped to the one BREI response resource in which the BREI response is received.

2. The method according to claim 1, wherein when uplink transmission is not received from the terminal, the beam failure is determined to have occurred, and the uplink transmission is physical uplink shared channel (PUSCH) transmission, physical uplink control channel (PUCCH) transmission, or sounding reference signal (SRS) transmission.

3. The method according to claim 1, wherein when a reception failure of uplink transmission of the terminal occurs more than M times during a preset time, the beam failure is determined to have occurred, and M is a natural number.

4. The method according to claim 1, wherein the DCI including the BREI is a DCI having a cyclic redundancy check (CRC) scrambled by a BREI-radio network temporary identifier (BREI-RNTI).

5. The method according to claim 1, further comprising: transmitting configuration information of an early beam recovery procedure to the terminal, wherein the configuration information includes at least one of information indicating that the early beam recovery procedure is enabled or a BREI-RNTI, and the early beam recovery procedure is initiated by the base station.

6. The method according to claim 1, further comprising:

transmitting an SRS transmission request to the terminal using a beam corresponding to the preferred beam; and receiving an SRS from the terminal on an SRS resource associated with the preferred beam.

7. A method of a terminal, comprising:

receiving, from a base station, a downlink control information (DCI) including a beam recovery early indicator (BREI), information on a first BREI response resource mapped to a first beam, and information on a second BREI response resource mapped to a second beam;

determining a beam in which a DCI with a best reception quality among the one or more DCIs is received as a preferred beam of the terminal; and transmitting to the base station, a BREI response in a BREI response resource mapped to the determined preferred beam of the terminal among the first BREI response resource and the second BREI response resource.

8. The method according to claim 7, wherein when the BREI and the DCI are received, a beam failure is determined to have been detected at the base station.

9. The method according to claim 7, wherein the receiving of the DCI from the base station comprises: detecting the DCI by performing blind decoding using a BREI-radio network temporary identifier (BREI-RNTI), and the DCI has a cyclic redundancy check scrambled by the BREI-RNTI.

10. The method according to claim 7, further comprising: receiving configuration information of an early beam recovery procedure from the base station, wherein the configuration information includes at least one of information indicating that the early beam recovery procedure is enabled or a BREI-RNTI, and the early beam recovery procedure is initiated by the base station.

11. The method according to claim 7, further comprising:

receiving a sounding reference signal (SRS) transmission request from the base station through a beam corresponding to the preferred beam; and transmitting an SRS to the base station on an SRS resource associated with the preferred beam.

12. A base station comprising at least one processor, wherein the at least one processor causes the base station to perform:

detecting a beam failure for a terminal;

in response to detecting the beam failure, transmitting a downlink control information (DCI) including a beam recovery early indicator (BREI), information on a first BREI response resource mapped to a first beam, and information on a second BREI response resource mapped to a second beam to the terminal based on a beam sweeping scheme;

receiving a BREI response in one BREI response among the first BREI response resource and the second BREI response from the terminal; and determining as a preferred beam of the terminal, a beam mapped to the one BREI response resource in which the BREI response is received.

13. The base station according to claim 12, wherein when uplink transmission is not received from the terminal, the beam failure is determined to have occurred, and the uplink transmission is physical uplink shared channel (PUSCH) transmission, physical uplink control channel (PUCCH) transmission, or sounding reference signal (SRS) transmission.

14. The base station according to claim 12, wherein the DCI including the BREI is a DCI having a cyclic redundancy check (CRC) scrambled by a BREI-radio network temporary identifier (BREI-RNTI).

* * * * *